United States Patent [19]

Wells

[11] 4,227,431
[45] Oct. 14, 1980

[54] AXIAL TUBE CUTTER FOR SEVERING ELECTRICAL CONNECTOR COUPLING RINGS

[75] Inventor: Royzell F. Wells, Littleton, Colo.

[73] Assignee: Martin Marietta Corporation, Bethesda, Md.

[21] Appl. No.: 10,344

[22] Filed: Feb. 8, 1979

[51] Int. Cl.³ .............................................. B23B 5/14
[52] U.S. Cl. ............................... 82/76; 82/77; 82/78; 82/93; 29/402.08; 29/426.4; 30/101; 30/102
[58] Field of Search ........................ 82/4 C, 60, 92, 93, 82/76, 94, 78, 77; 30/101, 102, 90.1, 90.2, 90.3; 81/9.5 R, 9.51; 29/402.08, 629

[56] References Cited

U.S. PATENT DOCUMENTS

| | | | |
|---|---|---|---|
| 1,085,967 | 2/1914 | Brown | 30/101 |
| 1,784,298 | 12/1930 | Mahan et al. | 81/9.51 |
| 1,876,914 | 9/1932 | Gordon | 82/2 E X |
| 2,743,520 | 5/1956 | Hofmaster | 30/102 |
| 2,880,635 | 4/1959 | Harris | 81/9.51 |

*Primary Examiner*—Leonidas Vlachos
*Attorney, Agent, or Firm*—Sughrue, Rothwell, Mion, Zinn and Macpeak

[57] ABSTRACT

An elongated cylindrical mandrel holds a dummy electrical connector receptacle at one end, and slidably carries a concentric tubular carrier which is biased towards the dummy receptacle. A plurality of circumferentially spaced spindles are hinge mounted at their one end to the carrier for pivoting angularly with respect to the carrier axis and carry cutter wheels on their outboard ends. A slide closer concentrically surrounds the carrier, is axially displaceable, and bears cam surfaces contacting the spindles to cause the spindles to pivot inwardly towards the dummy receptacle. When the mandrel is projected, the receptacle receives in attachment the electrical connector plug bearing the tubular bayonet coupling ring to be severed. A stop limits the pivoting of the spindles and cutter wheels to permit the ring to be severed circumferentially without damage to the plug or its wiring.

13 Claims, 5 Drawing Figures

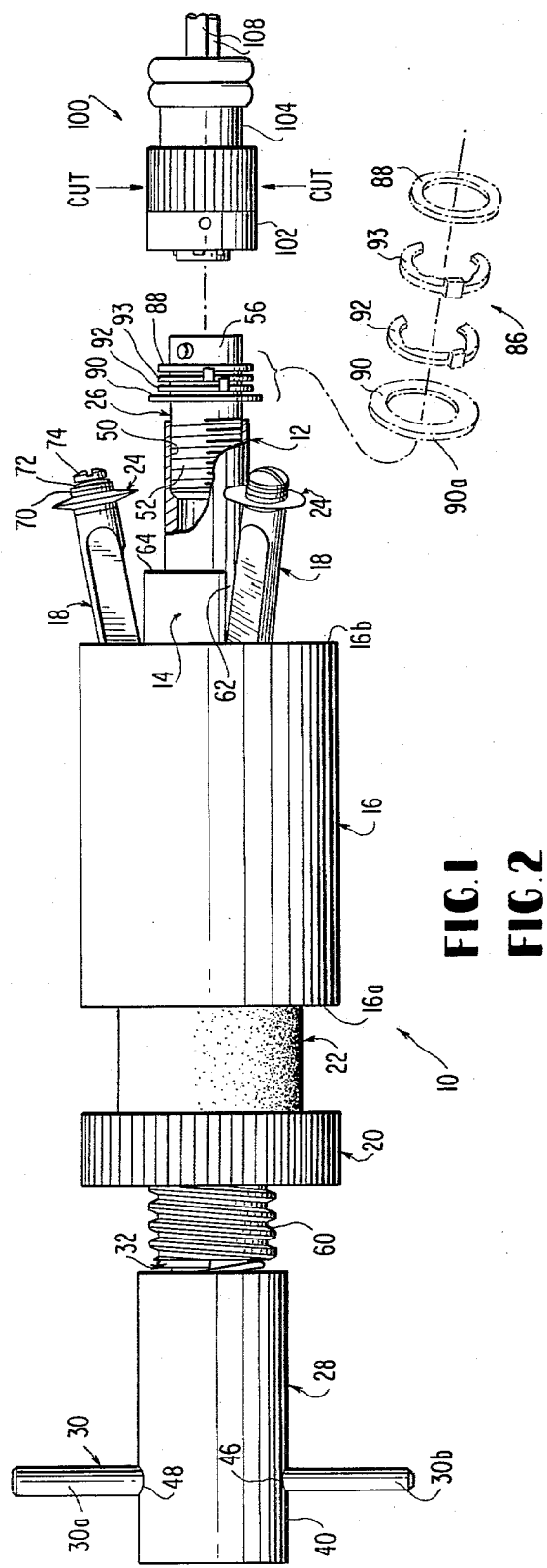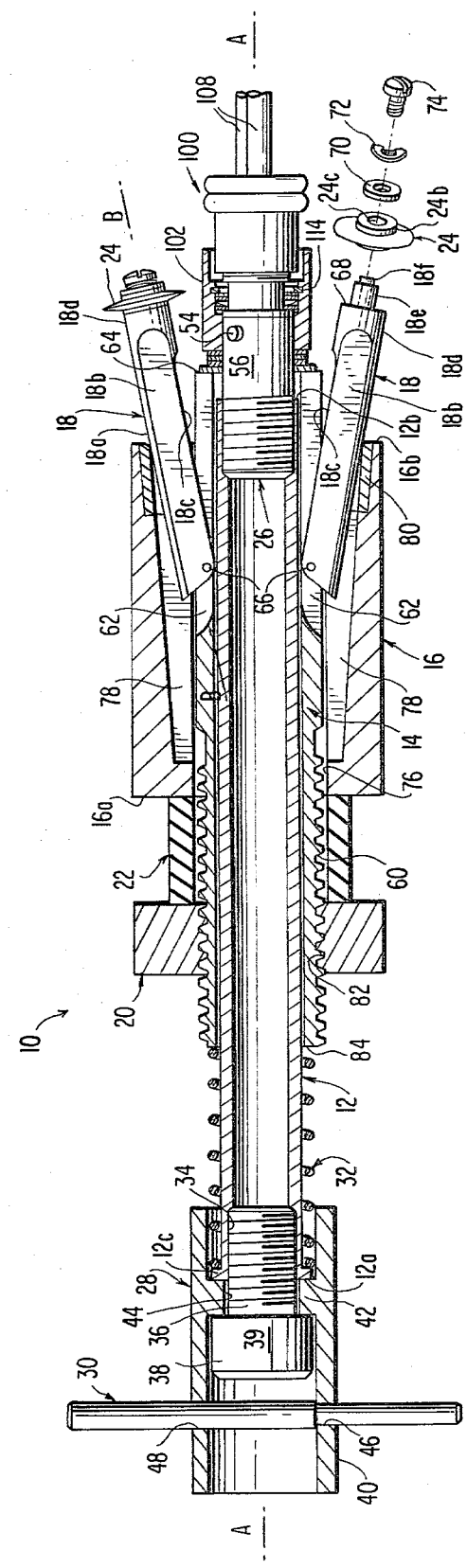
FIG. 1
FIG. 2

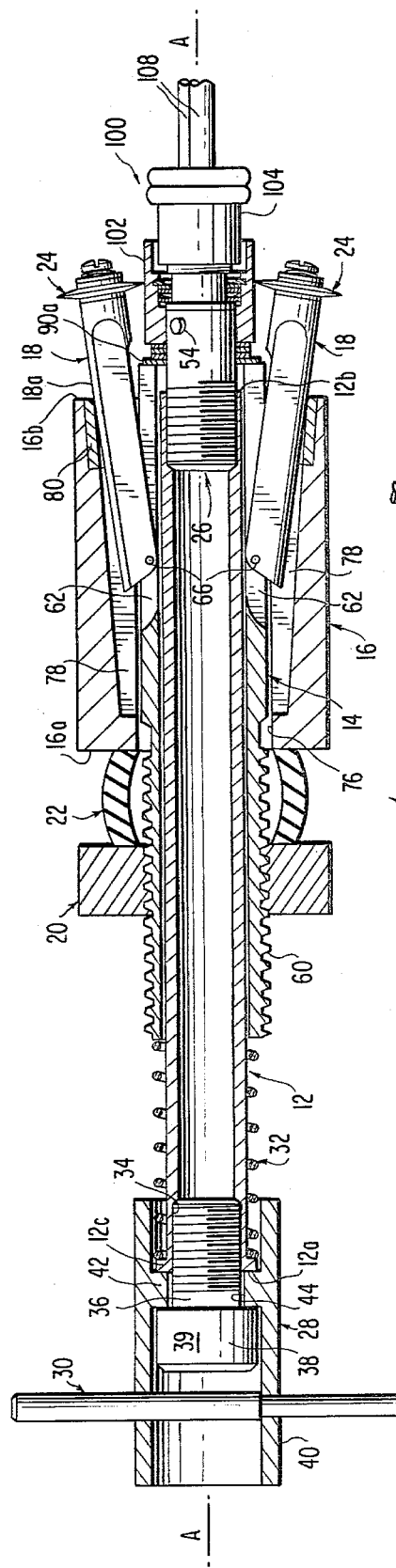
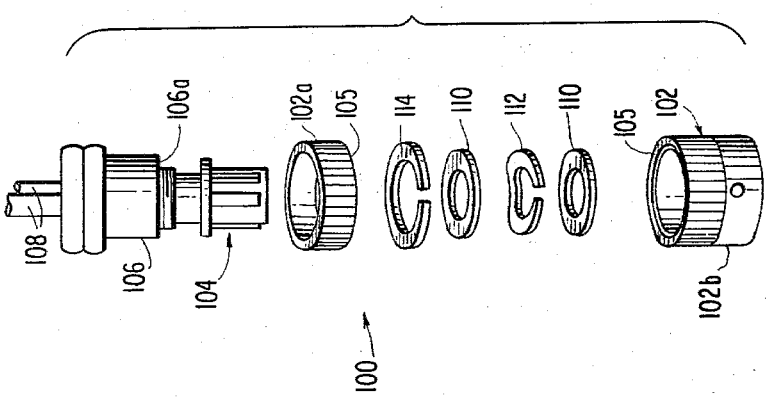
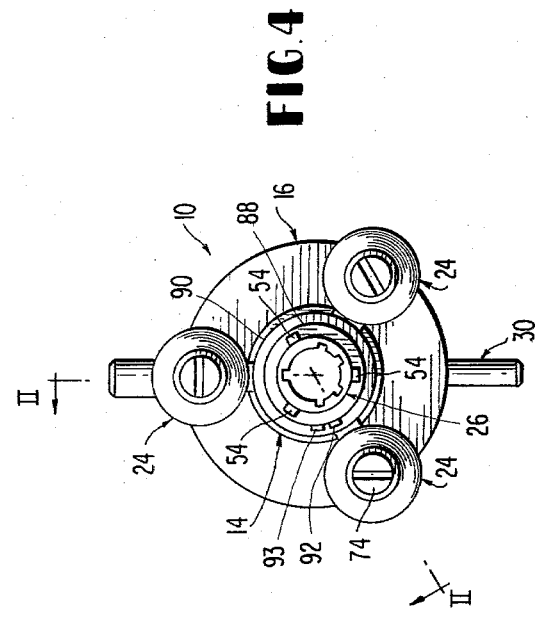

AXIAL TUBE CUTTER FOR SEVERING ELECTRICAL CONNECTOR COUPLING RINGS

This invention relates to copending application Ser. No. 10,345 filed Feb. 8, 1979, by Royzell F. Wells, and entitled "DOUBLE ACTION, ELECTRICAL CONNECTOR COUPLING DEVICE".

FIELD OF THE INVENTION

This invention relates to axial tube cutters, and more particularly, to an improved axial tube cutter which permits the severance and removal of coupling rings from existing wired and potted electrical connector plugs without compromising the mechanical or electrical integrity of the internal plug shell and wiring.

BACKGROUND OF THE INVENTION

Space rockets, or launch vehicles, employ a great number of multiple contact, cylindrical, electrical connectors. The most commonly used is the bayonet coupled connector. This connector employs a bayonet coupling ring, wherein three circumferentially spaced cam grooves inside the rotary coupling ring, on the plug half, engage three bayonet pins secured to or projecting from the circumference of the receptacle to mechanically lock the plug half to the receptacle. While this provides very rapid engagement and disengagement of the plug relative to the receptacle, the ends of the cam grooves must necessarily include detents to prevent the bayonet pins from backing down the ramps defined by the cam grooves, and the coupling ring requires a spring to bias and hold the bayonet pins within the detents. The spring also accommodates the manufacturing tolerances in both the plug and receptacle halves, thus the plug shell or body is held in the receptacle of tubular form by a spring rather than being firmly locked to the receptacle and prevented from axial and transverse movement.

Recent qualification testing of devices employing the bayonet coupled connectors caused electrical failures of the connectors. The devices were the electro-explosive separation nuts used on the Titan III launch vehicle at the stage 0 to 1, 1 to 2 and 2 to 3 separation interfaces. The qualification tests included subjecting ten separation units including the mating electrical connector plugs to extreme mechanical shock and random vibration environments. After completion of the environmental tests it was found that several of the electrical pin male contacts in the connectors were broken and there was severe damage to the plug coupling ring and the receptacle bayonet pins.

Failure analysis of the connectors concluded that the broken electrical pins, and the damage, were caused by the relative motion that occurred between the plug shell and the receptacle during the application of the shock and random vibration environments. It was further determined that the spring member would have to be removed from the coupling ring design and that the plug body would have to be rigidly connected to the receptacle in order for the connectors to survive the extreme environments. A new coupling ring has been designed and is being tested. The new coupling ring is replaceable onto the existing plug shells and is intermateable with the existing receptacles.

There are approximately 500 existing wired and potted electrical connector plugs on existing Titan IIIC and IIID launch vehicles that will have to have the new coupling ring installed; and, therefore, the existing old coupling rings removed. The plugs are accessible by extending the plugs and approximately six inches of the attendant cable out of the vehicles through the holes used to route the cables to the separation nuts. With so many such plugs on cables that have already been installed and electrically tested, there is a need for the quick removal of the coupling rings without in any way comprising the mechanical and electrical integrity of the remaining plug shell and wiring.

With electrical connectors in this environment, care must be taken to prevent contamination of the connectors and excessive flexing of the harness during the cutting operation. The severance of the coupling ring results in the generation of small metal chips. As long as the chips remain outside the connector members, there is no problem. However, if one enters the tool receptacle during disconnection, it could be transferred to the next connector and, if this happens, serious problems could result in the launch vehicle operation. Excessive flexing of the wire during the cutting operation could lead to loose back shells or broken wires.

In attempting to sever the coupling rings, a small, variable speed drill motor was employed utilizing both thin metal cutting circular saws and abrasive cut off discs to sever the coupling ring lengthwise at two places 180° circumferentially displaced. The use of such variable speed drill motors was unsatisfactory, since the severing process was too slow, too much heat was generated, an excessive amount of debris (chips and fillings) results, and it was necessary to create an elaborate fixturing to precisely control the contour of the cut.

In an alternate approach, a "nut buster" type device was employed to crack the coupling ring and to subsequently peel off the cracked coupling ring. A 10 inch plier type end cutter or nipper was reground to provide two cutting wedges with limited travel as opposed to the single cutter of a "nut buster". This was unsatisfactory because the compression force of the coupling ring was so great as to collapse the stainless steel receptacle shell onto the plug shell, thus damaging the plug shell. Also, even though the cutting wedges were positioned 180° apart on the coupling rings, the rings could not always be peeled off because they tended to break into approximately 120° and 240° segments because of the three 120° bayonet holes and cam grooves normal to such connectors.

Further, attempts to rupture or explode the coupling rings from within using mechanical leverage were made. However, this approach was abandoned because the hoop strength of the coupling ring is too great for the very thin wall levers which can be inserted between the coupling ring and the plug shell to achieve such rupture.

It is, therefore, a primary object of this invention to provide an improved cutter apparatus to sever circumferentially an electrical connector coupling ring in a safe and expeditious manner without affecting the mechanical and electrical quality integrity of the remaining plug shell and wiring.

It is a further object of the invention to provide an improved cutter apparatus for severing circumferentially a tubular member such as an electrical connector coupling ring which can be positioned at the proper axial position with respect to a plurality of spindle mounted cutting wheels surrounding the ring to be severed.

It is a further object of the present invention to provide an improved cutter apparatus for severing an electrical connector coupling ring or the like circumferentially in which a mandrel for attachment of the ring is projectable axially from the area of cutting to facilitate attachment and removal of the coupling ring thereto.

It is a further object of this invention to provide an improved cutter apparatus for severing an electrical connector coupling ring which does not exert undue forces on the cable, either tensile, twisting or repeated flexing at the connector and which does not damage or deteriorate the back shell, plug shell, insert or circuit contacts of the connector.

SUMMARY OF THE INVENTION

The cutter apparatus of the present invention, which is particularly adaptable to severing circumferentially, a tubular bayonet coupling ring of an electrical connector plug, comprises an elongated cylindrical mandrel having a tubular carrier concentrically mounted on the mandrel and slidable thereon. A dummy electrical connector receptacle is fixedly mounted on one end of the mandrel for detachably receiving the connector plug and its bayonet coupling ring. A coil spring biases the carrier axially towards the receptacle on the mandrel. The carrier mounts a plurality of circumferentially spaced spindles which are hinged to the carrier at one end and pivot with respect to the carrier axis. A slide closer concentrically surrounding the carrier is axially displaceable with respect thereto and is provided with cam surfaces which contact the outward faces of the spindles to cause the spindles to pivot towards the dummy receptacle when the closer is moved towards the receptacle. Cutter wheels are mounted for rotation about their axis on the free ends of the spindles. The cylindrical mandrel is first shifted axially with respect to the carrier against the coil biasing spring to project the dummy receptacle axially beyond the cutter wheels to permit the bayonet coupling ring of the connector plug to be concentrically mounted upon the dummy receptacle. Upon release of the mandrel, it shifts axially to position the ring in proper cutting position with respect to the cutter wheels. The slide closer is then shifted towards the end of the mandrel bearing the bayonet coupling ring to cause the cutter wheels to be presented into contact with the periphery of the bayonet coupling ring, and upon rotation of the slide closer and the tubular carrier with respect to the elongated cylindrical mandrel, the pressure acting through the cutter wheels causes the cutter wheels to sever the bayonet coupling ring into multiple, axial segments.

Stop means carried by the dummy receptacle limits radial travel of the hinged spindles towards the mandrel axis to limit the penetration of the cutter wheels to the bayonet coupling ring, and to prevent damage to the connector plug shell or its internal componentry.

Preferably, the slide closer comprises a tubular element and the apparatus further comprises an annular, manually operated hand wheel, threaded to the carrier. A circumferential resilient material cushion surrounding the carrier lies intermediate the hand wheel and the slide closer such that when the hand wheel is rotated, its longitudinal motion is transmitted through the cushion to the carrier to effect longitudinal shifting of the carrier and pivoting of the hinged spindles.

The dummy receptacle comprises a cylindrical member affixed to the mandrel and extending beyond the end of the mandrel and is provided with three bayonet pins secured to or projecting from the circumference of the receptacle near the outer end remote from the mandrel. Thrust washer means carried by the dummy receptacle are interposed between the end of the carrier and the bayonet pins to define the axial position of the bayonet coupling ring with respect to the plurality of cutter wheels under the bias of the biasing spring. Preferably, the elongated cylindrical mandrel is hollow and comprises internal right hand threads on its inner periphery at the end receiving the dummy receptacle, with the dummy receptacle threadedly mounted thereto. The hand wheel is threaded to the carrier with left hand threads such that the counterclockwise direction of rotation of the hand wheel to effect longitudinal movement of the slide closer is in the same direction in which the slide closer and carrier are rotated to cut the coupling ring. The coupling ring is mated to the receptacle in a clockwise direction from the outboard end of the receptcale; so, the direction of rotation of the hand wheel, slide closer, carrier, and cutters are all in the direction of coupling the coupling ring. This prevents the coupling ring from being uncoupled while being cut.

The stop preferably constitutes an enlarged diameter thrust washer located axially beyond the hinge mounting of the spindles in the direction of the cutter wheels such that the washer periphery contacts the spindles to limit movement of the cutter wheels inwardly to insure severance of the bayonet coupling ring into axial segments without damage to the plug shell bearing the coupling ring.

BRIEF DESCRIPTION OF THE DRAWINGS

FIG. 1 is a side elevational view of the improved axial tube cutter of the present invention, with the carrier spring compressed and the mandrel projecting axially beyond the cutter wheels to receive a male connector plug member and the coupling ring thereof to be circumferentially severed.

FIG. 2 is a sectional view of the cutter taken about line II—II of FIG. 4, with the mandrel retracted and the coupling ring axially positioned for cutting with respect to the cutter wheels.

FIG. 3 is a sectional view similar to that of FIG. 2, with the cutter wheels pressed into contact with the coupling ring to be severed.

FIG. 4 is an end view of the cutter as shown in FIG. 1, without the mating connector plug.

FIG. 5 is an exploded view of a Cannon electrical connector plug subsequent to severance of the skirt from the coupling ring by use of the cutter of FIGS. 1–4 inclusive.

DESCRIPTION OF THE PREFERRED EMBODIMENT

Reference to FIGS. 1–4 inclusive shows the improved axial tube cutter or apparatus of the present invention in one embodiment as applied specifically for cutting electrical connector plug coupling rings, although there are other possible variations of the cutter of the present invention making it applicable to cutting of plain cylindrical tubes. However, for illustration purposes, the cutter in the form of the illustrated embodiment is employed in severing, typically, a Cannon electrical connector plug bayonet coupling ring which is mechanically attached to the plug during its manufacture. The coupling ring is required to be severed circumferentially at at least one location intermediate of its ends (the location shown in FIGS. 1 and 3). Alternatively, a coupling ring for a Bendix connector and carried by the plug member of that connector, may be removed after severance of the coupling ring at two axially spaced locations on opposite sides of an internal flange. Thus, the cutter of the present invention provides the axial adjustability of the member being severed with respect to the cutter wheels which always cut at a given axial position with respect to the carrier bearing the spindles to which the cutter wheels are mounted.

The cutter or apparatus of the present invention and indicated generally at 10 in FIGS. 1-4, consists of a number of principal elements including a tubular mandrel indicated generally at 12, a cylindrical carrier indicated generally at 14, and a cylindrical slide closer indicated generally at 16 concentrcially surrounding the carrier 14 and being disposed to one side of a plurality of spindles 18 which are hinge connected to the carrier. On carrier 14, is a resilient cylindrical cushion 22 interposed between the slide closer 16 and the hand wheel 20. The spindles 18 individually support rotatable cutting or cutter wheels 24. The mandrel mounts a dummy connector receptacle 26 at one end and has fixed to its opposite end, a handle 28 including T bar 30. The cutter or apparatus 10 further includes a carrier coil spring 32 interposed between the carrier 14 and the handle 28, being mounted on mandrel 12 for biasing the carrier toward the dummy receptacle 26.

These are the major components of the apparatus and advantageously permits the ready coupling of the bayonet type coupling ring of a selected connector plug to the dummy receptacle 26 and facilitates the ready severance of the bayonet coupling ring into two or more axial segments by cutting circumferentially through the coupling ring without contact with the male connector plug shell or the internal componentary carried by the same.

The mandrel 12, like most of the components, is formed of metal; the mandrel 12 being in the form of a hollow tube and being provided with opposed ends as at 12a and 12b respectively. The end 12a terminates in a radial flange 12c, this end 12a being internally threaded at 34 so as to receive the threaded shaft 36 of a locking screw 38. The handle 28 comprises a cylindrical tube 40 having an internal diameter in excess of the diameter of the headed end 39 of the locking screw with the tube 40 bearing an internal flange 42 intermediate of its ends which has a diameter 44 slightly in excess of that of the threaded shaft 36 of the locking screw 38. Thus, when the locking screw 38 is threaded through the end 12a of the mandrel 12, the head 39 of the locking screw locks the handle tube 40 against the flange 12c of mandrel 12. The handle 28 is completed by a T bar 30 which projects through the tube 40, the bar 30 having a large diameter portion 30a and a small diameter portion 30b with the small diameter portion 30b of the T bar 30 projecting through a small diameter hole 46, the larger diameter portion 30a of that bar projecting through an opposing larger diameter hole 48 within tube 40. The T bar 30 is press fitted into the tube 40 at hole 46.

The opposite end 12b of mandrel 12 is threaded internally as at 50, so as to threadably carry the dummy receptacle 26. Receptacle 26 is in most respects identical to the receptacle connector member of a connector in actual use, but of course is threaded to the mandrel, simply for the purposes of mounting the connector plug from the actual electrical installation for the required severance of the plug bayonet coupling ring.

In that respect, the dummy receptacle 26 as illustrated is an inert ordnance pressure cartridge having its conventional hexagonal mounting flange machined off and is of tubular shell construction, bearing threads 52 on one end, and bearing a plurality (three) of bayonet pins 54 which project radially outward from the non-threaded peripheral portion 56 of dummy receptacle 26. The mandrel 12 is used in this specific application to precisely position the mating plug connector bayonet coupling ring at a proper axial position beneath the cutter wheels 24 borne by spindles 18. The tubular or cylindrical carrier 14, which is also formed of metal, has an internal diameter which is slightly in excess of the external diameter of mandrel 12 and is slidably and rotatably mounted on that mandrel.

The cutter or apparatus 10 of the present invention employs three spindles 18 which are hinge mounted to the carrier at equal circumferentially displaced positions, that is, they are 120° apart. In this regard, the carrier 14 is provided with three elongated longitudinally extending slots 62 which are circumferentially spaced 120° and extend from the median portion of the carrier to end 64 of the carrier. The spindles 18 are positioned within the slots 62 and hinge mounted by way of pins 66 such that the spindles 18 lie in planes through the carrier axis and pivot about the axis of the pins 66 within the slots 62, moving angularly relative to the axis A of the apparatus. The spindles 18 are of modified cylindrical cross-section along their portions with their outer longitudinal surfaces 18a being convex in cross-section to act as cam followers for the spindles. The sides 18b of the spindles 18 are flat and parallel so as to operate in the slots 62 of the carrier. The inner longitudinal surfaces 18c of the spindles 18 are flat for most of the length of the spindles. The spindles 18 at their outboard ends 18d are circular in cross-section with the end 18d terminating in reduced diameter portions 18e and 18f. The reduced diameter portions 18e bear the cutting wheels 24, each cutting wheel 24 being provided with a hub 24b having a bore 24c slightly larger than the diameter of the reduced diameter portion 18e of the spindle 18. The further reduced diameter 18f of spingle 18 bears the plain washer 70 which is held in place on diameter 18f by the spring washer 72 and screw 74. When the cutter wheels 24 cut into the connector plug coupling rings, they do so at a slight angle with respect to the plane perpendicular to the axis A of the cutter or apparatus. As the cutter wheels 24 cut deeper and deeper into the coupling ring the cutter wheels tend to shift with respect to the axis A of the apparatus. The cutter wheels also tend to shift with respect to axis B of the spindles 18. The spring washer 72 allows the cutter wheel 24 to shift along the diameter 18e, thus preventing binding of the cutter wheels during cutting.

As mentioned previously, the slide closer 16, which is a cylindrical or tubular member, concentrically surrounds a portion of the carrier 14. Slide closer 16 has opposed ends 16a and 16b, and has an internal diameter 76 which is slightly larger than the outside diameter of carrier 14. The interior wall 76 of the slide closer 16 is provided with three circumferentially spaced, longitudinal slots or grooves 78 which extend almost the complete length of the slide closer 16 from a point near the end 16a of that member to the complete opposite end 16b. Further the slots at end 16b are provided with arcuate metal inserts or cam members 80 which are of metal and are of concave configuration and bear on the convex cam follower surfaces 18a of the individual spindles 18. Further, the resilient elastomeric material sleeve 22, having an internal diameter on the order of the internal diameter or wall 76 of the slide closer 16, is concentrically mounted on the carrier 14 having one end in contact with the end 16a of the slide closer 16 and an opposite end in contact with the hand wheel 20. The hand wheel 20 is provided with internal threads 82 which are left handed and of the same pitch as the threads 60 of the carrier 14. The outer periphery of the hand wheel 20 may be knurled as desired. The cylindrical cushion 22 therefore functions to transmit the force, generated by rotation of the hand wheel 20, to the slide closer 16, and the cushion 22 may be axially compressed during manual rotation of the hand wheel 20, due to the reaction forces transmitted through the spindles 18 to the slide closer 16, this acting beneficially during the severance of the bayonet coupling ring by causing the slide closer 16 to follow the pivoting of the spindles 18 during cutting of the ring, as will be later fully appreciated in the further description of the invention.

The carrier 14 is of an axial length which is somewhat shorter than the mandrel 12, upon which it slides, and has its end 84 spaced somewhat from the flange 12c of the mandrel and maintained in a position, axially remote from the handle 28 by the carrier coil spring 32. The coil spring 32 bears at one end against the mandrel flange 12c and on its opposite end against the end 84 of the carrier 14. This tends to bias the carrier 14 axially away from the handle 28 and towards the dummy receptacle 26. It is the bias acting on the mandrel that is used in the specific structure to precisely position the plug bayonet coupling ring under the cutter wheels. In that respect, by reference to FIG. 1, it may be seen that the carrier spring 32 has been fully compressed, thereby causing the mandrel 12 to be shifted to the right relative to the carrier 14 and the slide closer 16. Thus, the dummy receptacle 26 is projected axially well beyond the cutting wheels 24 so as to permit easy coupling of the male connector plug and its bayonet coupling ring to the dummy receptacle 26 with the bayonet coupling ring locked to the receptacle 26 via the radially projecting pins 54 on the peripheral surface 56 of that member. Because the cutting wheel spindles 18 are fixed (hinged) to the carrier 14 of the cutter apparatus, the location of the cut on the coupling ring is controlled by the amount of space between the end of the carrier 14 and the nose of the coupling ring. This can perhaps best be seen in FIG. 1. This is accomplished advantageously in the present invention by the utilization of a washer assembly, indicated generally at 86 and constituted partially by a smaller outside diameter thrust washer 88 which mounts to the peripheral surface 56 of the dummy receptacle 26 and which is prevented from moving axially off that member by the radially projecting pins 54, and a second thrust washer 90 of larger outside diameter which is also borne by this portion of the dummy receptacle 26.

The invention also advantageously employs a number of snap ring spacers which are of C-shaped configuration as at 92, 93, and which are interposed on the surface 56 of the dummy receptacle 26 intermediate of the smaller outboard thrust washer 88 and the larger external diameter thrust washer 90. While two of the snap ring spacers are shown at 92 and 93, of different thickness, as employed in the illustrated embodiment of the invention in achieving the circumferential severance of a bayonet coupling ring for a conventional Cannon type electrical connector, the number and thickness of snap rings may be readily varied to cause the bayonet coupling ring to have its nose shifted axially with respect to the carrier which bears the cutter wheels 24.

As may be seen in FIG. 2, the expansion of the compression coil spring 32 causes the carrier 14 to shift towards the end of the mandrel 12 bearing the dummy receptacle 26 until the end 64 of the carrier 14 abuts the larger outside diameter thrust washer 90. It is obvious, therefore, that the thrust washers 88 and 90 are permanently installed on the dummy receptacle 26, while the snap ring type spacers 92 and 93 are easily laterally removed and installed as desired, depending upon the configuration and size of the plug connector bayonet coupling ring or similar coupling ring of the electrical connector to which the apparatus is being employed.

A further important aspect of the present invention is the fact that the larger outside diameter thrust washer 90 provides by way of its outer peripheral surface 90a a radial stop insofar as the hinged spindles 18 are concerned. The peripheral surface 90a limits the extent of radial inward movement of the spindles 18 by contact with the radially inner wall 18c of these members. Thus, the larger outside diameter thrust washer 90 limits the pivotal travel of the spindles 18 and thereby the depth of the cutter wheels 24, preventing inadvertent contact of the cutter wheels 24 with the plug shell of the male connector bearing the bayonet coupling ring to be severed circumferentially.

The carrier spring 32 maintains the closure of the carrier, thrust washers, spacers, and coupling ring during the cutting operation. The T bar 30 of the handle 28 provides the operator with tactile control during the cutting operation to avoid rotating the whole assembly and the resultant twisting of the connector cable 108 which extends from the male connector plug member.

In operation of the cutter apparatus, the left hand threaded hand wheel 20 is rotated clockwise until it threads itself to the left end 84 of carrier 14. Next, the cushion 22 and the slide closer 16 are slid on carrier 14 from right to left until the cushion 22 contacts the hand wheel 20, thus permitting the spindles 18 to be pivoted outwardly with respect to the axis A of the assembly, thus opening the spindles against the slide closer 16. Next, the complete cutter assembly consisting of the carrier 14, spindles 18, cutters 24, slide closer 16, cushion 22, and hand wheel 20, is slid to the left with respect to the handle 28, compressing the carrier spring 32 and exposing the end 64 of mandrel 12 and the dummy receptacle 26. With the dummy receptacle 26 bearing thrust washers 88 and 90, a determination is made as to the number of snap ring type spacers 92, 93, etc., which are required for properly placing the bayonet coupling ring with respect to the cutting wheels 24 for achieving cutting operation.

With respect to a Cannon type connector and the male plug 100, FIG. 5, which bears a bayonet coupling ring 102, to be severed, only one cut is to be made and a single spacer 92 may be employed and interposed between thrust washers 88 and 90 of the assembly 86 in this instance. In the illustrated embodiment of the invention, the thicker (0.042 inches) of the two spacers 92 is employed. However, the invention has application to Bendix connector plugs which require a first cut to be made without any spacers and a second cut to be made using both (0.042 and 0.032 inches) spacers 92 and 93, respectively.

After installation of a proper spacer or spacers, the connector plug 100 is mated to the dummy receptacle member 26, this being achieved by use of the bayonet coupling ring 102 of that plug with the bayonet grooves (not shown) of the bayonet coupling ring 102 receiving the projecting pins 54 of the dummy receptacle 26. The installation of the male connector plug 100 to the dummy receptacle 26 is facilitated by the actual projection of the dummy receptacle 26 well beyond the cutter wheels 24. Release of the carrier and its supported hand wheel and slide closer 16 causes the compression of carrier spring 32 to expand, forcing the end 64 of the carrier 14 to contact the radial sidewall of the large outside diameter thrust washer 90. The spring force also closes all spaces between the thrust washer 90, the spacer 92, thrust washer 88, and the coupling ring 102 to properly locate the coupling ring under the cutter wheels.

Next, the slide closer 16 is slid to the right, FIG. 2, to the extent that the cam inserts 80 contact the cam follower surfaces 18a of the spindles and while holding the slide closer 16, the hand wheel 20 is rotated counterclockwise to tighten the hand wheel 20. During tightening of the hand wheel 20, the cushion 22 is compressed, causing it to bulge outwardly. Subsequently, while holding the T bar handle against rotation, the cutter assembly is rotated counterclockwise by rotating the slide closer 16 until the cutting resistance diminishes. What occurs, is the fact that the cutter wheels 24, in penetrating the surface of the bayonet coupling ring 102, effect a partial severance of that ring until the cutting resistance diminishes and the cushion is relieved of its stress. A repetition of the hand wheel tightening and cutter assembly turning is effected until the coupling ring 102 is severed completely through, this severance being limited by the periphery 90a of the large thrust washer 90 which acts as a stop for the hinged spindles 18.

Subsequent to severance, in this case by way of a single cut through the bayonet coupling ring 102 of the Cannon connector, the cutter wheels 24 are opened by rotating the hand wheel 20 clockwise and moving the cushion 22 and the slide closer 16 to the left.

To appreciate the utility of the present invention, further reference may be had to FIG. 5 which shows the make up, in an exploded view, of the Cannon connector plug. The coupling ring indicated generally at 102 has been severed at 105 into two axial segments, a skirt 102a and the coupling ring proper 102b. Further, the plug connector 100 comprises a plug shell or body 104 which contains the electrical contacts (not shown), the potted back shell 106, and the wires or cables 108 exiting from the back shell.

In terms of making the mechanical coupling and maintaining the same between the male plug 100 and an active female receptacle (not shown) or in this case the dummy receptacle 26, the male plug further comprises in addition to ring 102, thrust washers 110, an interposed wave spring 112 and a snap ring 114, in that order, constituting an axial array inside the coupling ring.

With the cutter wheels 24 open and in the position shown in FIG. 2, subsequent to severance of the coupling ring 102 into segments 102a and 102b, without uncoupling the coupling ring segment 102b, the operator grasps the plug back shell 106 and pulls shell 104 out of the dummy receptacle 26. This leaves the forward portion of the coupling ring, segment 102b, on the dummy receptacle 26. It may be removed by retracting the cutter assembly as above and removing the coupling nut in the normal manner, i.e., by rotating the segment counterclockwise from the receptacle. The forward portion of the coupling ring may be discarded.

With respect to the illustrated embodiment of the invention, as applied to a Cannon type connector, the internal snap ring 114 in the Cannon coupling ring 102 is usually released when the plug shell 104 is pulled out of the receptacle 26. If the snap ring 114 remains in the rear portion or segment 102a of the coupling ring, that portion or segment 102a of the coupling ring is pushed over the nose 106a of the back shell 106, forcing the snap ring 114 out of its half groove. The free snap ring 114 is then easily removed over the thrust washers 110, wave spring 112, and plug shell 104. Likewise, after the snap ring has been removed from the rear segment 102a, the rear segment is easily removed over the thrust washers, wave spring, and plug body. The front wave spring thrust washer 110 may then be severed using small diagonal cutters and it may easily then be peeled from the plug shell 104. The wave spring may then be pulled off the plug shell 104 and the rear thrust washer may then be cut and peeled off in the same manner as the front wave spring thrust washer 110. The plug shell 104 may be inspected and cleaned, if necessary, in a conventional manner.

When the cutter apparatus of the present invention is employed in conjunction with a Bendix connector, the coupling ring is severed at two locations and into three segments. As with the Cannon connector, the front segment of the Bendix coupling ring remains on the dummy receptacle when the plug shell is pulled out of the receptacle. This leaves two wave springs exposed on the plug shell in front of the second, or middle, segment and the wave springs are easily removed from the plug shell. By use of sturdy snub-nosed diagonal cutters, the middle segment of the coupling ring is cut at two places approximately 180° apart and the two pieces are removed from the plug shell. This permits sliding the rear, or third, segment of the severed coupling ring off the plug shell. This permits the plug shell to be inspected and cleaned prior to installing replacement coupling rings.

The nature and operation of the improved axial tube cutter of the present invention may be appreciated by the above description both in terms of structure and operation. It should be readily apparent, that the structure has uses other than in conjunction with Cannon, Bendix and other type electrical connectors employing a bayonet coupling ring to achieve the mechanical connection between the two connector halves. The present cutter apparatus may be employed as a conventional tube cutter, with the smallest possible swing radius in the plumbing, heating and air conditioning field, the cutter may function as a nipple cutter and modified with an adjustable stop in place of the mandrel for cutting short precise lengths of tubing; and, it is further apparent that the rotary design of the cutter lends itself to being power driven as in a drill chuck rather than being hand driven by the hand wheel in conjunction with the cylindrical cushion interposed between the slide closer and the hand wheel.

While the invention has been particularly shown and described with reference to a preferred embodiment thereof, it will be understood by those skilled in the art that various changes in form and details may be made therein without departing from the spirit and scope of the invention.

What is claimed is:

1. An apparatus for circumferentially severing a tubular bayonet coupling ring of an electrical connector plug or the like, said mechanism comprising:

an elongated cylindrical mandrel, a tubular carrier concentrically mounted on said mandrel and slidable thereon, a dummy electrical connector receptacle fixedly mounted on one end of said mandrel for detachably receiving said bayonet coupling ring, means forming a longitudinal stop for said carrier against biasing movement, biasing means for biasing said carrier axially towards said dummy receptacle, a plurality of circumferentially spaced spindles hinge mounted at one end to said carrier for pivoting angularly with respect to said carrier axis, a slide closer concentrically surrounding said carrier, being axially displaceable thereto and having cam surface means contacting said spindles to cause said spindles to pivot towards said dummy receptacle, and cutter wheels mounted for rotation on the other ends of said spindles;

whereby, said cylindrical mandrel may be first shifted axially with respect to said carrier against said biasing means to project said dummy receptacle axially beyond the cutter wheels to permit said bayonet coupling ring of said connector plug to be concentrically mounted upon said dummy receptacle; secondly, upon release of said mandrel, said mandrel shifts axially to position said ring in proper axial cutting position with respect to said cutter wheels; thirdly, said slide closer may be shifted towards the end of said mandrel bearing said bayonet coupling ring to cause said cutter wheels to be pressed into contact with the periphery of said bayonet coupling ring, and rotation of said slide closer and said tubular carrier with respect to said elongated cylindrical mandrel causes said cutter wheels to sever said bayonet coupling ring into multiple axial segments.

2. The apparatus as claimed in claim 1, further comprising stop means carried by said dummy receptacle to limit the travel of said hinged spindles towards said mandrel axis to limit the penetration of said cutter wheels to through said bayonet coupling ring only.

3. The apparatus as claimed in claim 1, wherein said slide closer comprises a tubular element, and said apparatus further comprises an annular, manually operated hand wheel threaded to said carrier and a cylindrical resilient material cushion surrounding said carrier between said hand wheel and said slide closer such that rotation of said hand wheel transmits longitudinal motion through said cushion to said slide closer to effect longitudinal shifting of said slide closer and pivoting of said hinged spindles.

4. The apparatus as claimed in claim 2, wherein said slide closer comprises a tubular element, and said apparatus further comprises an annular, manually operated hand wheel threaded to said carrier and a cylindrical resilient material cushion surrounding said carrier between said hand wheel and said slide closer such that rotation of said hand wheel transmits longitudinal motion through said cushion to said slide closer to effect longitudinal shifting of said slide closer and pivoting of said hinged spindles.

5. The apparatus as claimed in claim 1, wherein said dummy receptacle comprises a cylindrical member affixed to said mandrel and extending beyond the end of said mandrel and having three bayonet pins projecting from the circumference of the receptacle near the outer end remote from the mandrel, and said apparatus further comprising washer means carried by said dummy receptacle, interposed between the end of said carrier and said bayonet pins to facilitate axial positioning of said bayonet coupling ring with respect to said plurality of cutter wheels under the bias of said biasing means.

6. The appartus as claimed in claim 2, wherein said dummy receptacle comprises a cylindrical member affixed to said mandrel and extending beyond the end of said mandrel and having three bayonet pins projecting from the circumference of the receptacle near the outer end remote from the mandrel, and said apparatus further comprising washer means carried by said dummy receptacle, interposed between the end of said carrier and said bayonet pins to facilitate axial positioning of said bayonet coupling ring with respect to said plurality of cutter wheels under the bias of said biasing means.

7. The apparatus as claimed in claim 3, wherein said dummy receptacle comprises a cylindrical member affixed to said mandrel and extending beyond the end of said mandrel and having three bayonet pins projecting from the circumference of the receptacle near the outer end remote from the mandrel, and said apparatus further comprising washer means carried by said dummy receptacle, interposed between the end of said carrier and said bayonet pins to facilitate axial positioning of said bayonet coupling ring with respect to said plurality of cutter wheels under the bias of said biasing means.

8. The apparatus as claimed in claim 4, wherein said dummy receptacle comprises a cylindrical member affixed to said mandrel and extending beyond the end of said mandrel and having three bayonet pins projecting from the circumference of the receptacle near the outer end remote from the mandrel, and said apparatus further comprising washer means carried by said dummy receptacle, interposed between the end of said carrier and said bayonet pins to facilitate axial positioning of said bayonet coupling ring with respect to said plurality of cutter wheels under the bias of said biasing means.

9. The apparatus as claimed in claim 1, wherein said elongated cylindrical mandrel is hollow and comprises internal right hand threads on its inner periphery at said end receiving said dummy receptacle, and said dummy receptacle is threadably attached thereto, and wherein said hand wheel is threaded to said said carrier with left hand threads such that the counterclockwise direction of rotation of the hand wheel to effect longitudinal movement of the slide closer is in the same direction that the slide closer and carrier are rotated to cut the coupling ring, said coupling ring being mated to the receptacle in a clockwise direction from the outboard end of the receptacle; thus, the direction of rotation of the hand wheel, slide closer, carrier, and cutters are all in the direction of coupling the coupling ring, preventing the coupling ring from being uncoupled while being cut.

10. The apparatus as claimed in claim 2, wherein said washer means comprises at least one thrust washer having an enlarged diameter and located beyond the hinge mounting of said spindles in the direction of said cutting wheels, such that said thrust washer periphery contacts said spindles to limit movement of said cutter wheels inwardly, thereby forming said stop means to facilitate severance of said bayonet coupling ring without damage to the portion of the electrical connector plug bearing said coupling ring.

11. The apparatus as claimed in claim 3, wherein said washer means comprises at least one thrust washer having an enlarged diameter and located beyond the hinge mounting of said spindles in the direction of said cutting wheels, such that said thrust washer periphery contacts said spindles to limit movement of said cutter wheels inwardly, thereby forming said stop means to facilitate severance of said bayonet coupling ring without damage to the portion of the electrical connector plug bearing said coupling ring.

12. The apparatus as claimed in claim 5, wherein said washer means comprises at least one thrust washer having an enlarged diameter and located beyond the hinge mounting of said spindles in the direction of said cutting wheels, such that said thrust washer periphery contacts said spindles to limit movement of said cutter wheels inwardly, thereby forming said stop means to facilitate severance of said bayonet coupling ring without damage to the portion of the electrical connector plug bearing said coupling ring.

13. The apparatus of claim 9, wherein said washer means comprises at least one thrust washer having an enlarged diameter and located beyond the hinge mounting of said spindles in the direction of said cutting wheels, such that said thrust washer periphery contacts said spindles to limit movement of said cutter wheels inwardly, thereby forming said stop means to facilitate severance of said bayonet coupling ring without damage to the portion of the electrical connector plug bearing said coupling ring.

* * * * *